(12) United States Patent
Nazemi et al.

(10) Patent No.: US 10,274,600 B2
(45) Date of Patent: Apr. 30, 2019

(54) LASER DESIGNATOR PULSE DETECTION

(71) Applicant: Sensors Unlimited, Inc., Princeton, NJ (US)

(72) Inventors: Jonathan Nazemi, Doylestown, PA (US); Robert Rozploch, Newtown, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 690 days.

(21) Appl. No.: 14/938,346

(22) Filed: Nov. 11, 2015

(65) Prior Publication Data
US 2016/0282178 A1 Sep. 29, 2016

Related U.S. Application Data

(60) Provisional application No. 62/140,250, filed on Mar. 30, 2015, provisional application No. 62/139,401, (Continued)

(51) Int. Cl.
*G01J 1/44* (2006.01)
*G01S 17/66* (2006.01)
(Continued)

(52) U.S. Cl.
CPC .............. *G01S 17/66* (2013.01); *F41G 3/145* (2013.01); *F41G 3/165* (2013.01); *F41G 7/226* (2013.01);
(Continued)

(58) Field of Classification Search
CPC .......... G01J 1/44; G01J 1/0295; G01J 1/0488; G01J 2001/4238; F41G 3/145; F41G 7/226; F41G 7/2293
See application file for complete search history.

(56) References Cited

U.S. PATENT DOCUMENTS 7,773,202 B2    8/2010  Crawford et al.
8,130,367 B2    3/2012  Stettner et al.
(Continued)

FOREIGN PATENT DOCUMENTS

EP    2816309 A2    12/2014
EP    2816310 A2    12/2014
(Continued)

OTHER PUBLICATIONS

Belgian Search Report and Opinion dated Nov. 17, 2016, issued during the prosecution of corresponding European Patent application No. 2016/5218 (13 pages).

*Primary Examiner* — Georgia Y Epps
*Assistant Examiner* — Don J Williams
(74) *Attorney, Agent, or Firm* — Locke Lord LLP; Scott D. Wofsy; Joshua L. Jones

(57) ABSTRACT

A laser designator pulse detector includes an InGaAs photodetector configured to convert laser signals into electrical signals. A Read Out Integrated Circuit (ROIC) is operatively connected to the InGaAs photodetector to condition electrical signals from the InGaAs photodetector. The ROIC can be operatively connected to a peripheral device including one or more modules configured to process signals from the ROIC and provide pulse detection, decoding, and tracking. In another aspect, a laser designator pulse detector includes a two-dimensional array of photodetectors configured to convert laser signals into electrical signals. A ROTC as described above is operatively connected to the two-dimensional array of photodetectors.

13 Claims, 1 Drawing Sheet

Related U.S. Application Data filed on Mar. 27, 2015, provisional application No. 62/139,371, filed on Mar. 27, 2015.

(51) Int. Cl.

| | | |
|---|---|---|
| *F41G 3/14* | (2006.01) | |
| *F41G 7/22* | (2006.01) | |
| *G01J 1/02* | (2006.01) | |
| *G01J 1/04* | (2006.01) | |
| *G01S 17/00* | (2006.01) | |
| *G01S 7/484* | (2006.01) | |
| *G01S 7/486* | (2006.01) | |
| *F41G 3/16* | (2006.01) | |
| *G01J 1/42* | (2006.01) | |

(52) U.S. Cl.
CPC .......... *F41G 7/2293* (2013.01); *G01J 1/0295* (2013.01); *G01J 1/0488* (2013.01); *G01J 1/44* (2013.01); *G01S 7/484* (2013.01); *G01S 7/4861* (2013.01); *G01S 17/003* (2013.01); *G01J 2001/4238* (2013.01)

(56) References Cited

U.S. PATENT DOCUMENTS

| | | |
|---|---|---|
| 8,243,103 B2 | 8/2012 | Dobbie et al. |
| 8,378,279 B2 | 2/2013 | Mourar et al. |
| 8,451,432 B2 | 5/2013 | Crawford et al. |
| 8,606,496 B2 | 12/2013 | Stettner et al. |
| 8,829,404 B1 | 9/2014 | Rinker |
| 2007/0153281 A1* | 7/2007 | Gordon ............ G01J 3/36 356/419 |
| 2010/0108859 A1 | 5/2010 | Andressen |
| 2011/0272559 A1* | 11/2011 | Woolaway ............ G01S 7/4863 250/214 R |
| 2012/0211665 A1 | 8/2012 | Cloud et al. |
| 2012/0248288 A1 | 10/2012 | Linder et al. |
| 2012/0249781 A1 | 10/2012 | Vollmerhausen |
| 2013/0336536 A1 | 12/2013 | Perruchot et al. |
| 2014/0231576 A1 | 8/2014 | Rinker |
| 2014/0312161 A1 | 10/2014 | Ell |
| 2014/0374533 A1 | 12/2014 | Ell et al. |

FOREIGN PATENT DOCUMENTS

| | | |
|---|---|---|
| EP | 2816312 A2 | 12/2014 |
| WO | WO-2011/076480 A1 | 6/2011 |

\* cited by examiner

LASER DESIGNATOR PULSE DETECTION

CROSS-REFERENCE TO RELATED APPLICATIONS

The subject application claims the benefit of priority to U.S. Provisional Patent Applications Ser. No. 62/139,401, filed on Mar. 27, 2015; 62/139,371, filed Mar. 27, 2015; and 62/140,250, filed Mar. 30, 2015, the disclosure of which are herein incorporated by reference in its entirety.

BACKGROUND OF THE INVENTION

1. Field of the Invention

The present disclosure relates to laser designation, and more particularly to detection of pulsed laser signatures from pulsed laser designators.

2. Description of Related Art

A variety of devices and methods are known in the art for laser spot tracking. A traditional laser designation system includes a laser designator, which is used to illuminate or paint an object of interest. The laser designator emits laser pulses in a predetermined pulse train according to the setting as designated by the user. A tracking device can detect the laser spot and track it.

Such conventional methods and systems have generally been considered satisfactory for their intended purpose. However, there is still a need in the art for improved laser designator pulse detection. The present disclosure provides a solution for this need.

SUMMARY OF THE INVENTION

A laser designator pulse detector includes an Indium Gallium Arsenide (InGaAs) photodetector configured to convert laser signals into electrical signals. A Read Out Integrated Circuit (ROIC) is operatively connected to the InGaAs photodetector to condition electrical signals from the InGaAs photodetector.

The InGaAs photodetector can be configured to receive wavelengths up to and including 1700 nm. For example, it is contemplated that the InGaAs photodetector can be configured to detect laser light of 1064 nm wavelength and/or of 1550 nm wavelength.

The ROIC can be operatively connected to a peripheral device which includes one or more electronic modules configured to process signals from the ROIC and provide pulse detection, decoding, and tracking. The ROIC can be configured to read from the InGaAs photodetector at a frequency of 20 kHz. It is also contemplated that the ROIC can be operatively connected to the InGaAs photodetector to condition the electrical signals for detecting, tracking, and decoding multiple laser spots at a time in a separate module. A filter assembly can be optically coupled to the InGaAs photodetector to improve signal to noise ratio.

In another aspect, a laser designator pulse detector includes a two-dimensional array of photodetectors configured to convert laser signals into electrical signals. A ROIC is operatively connected to the two-dimensional array of photodetectors to condition signals from the two-dimensional array for detecting, tracking, and decoding pulsed codes in the electrical signals in a separate module.

The two-dimensional array of photodetectors can include a plurality of rows and a plurality of columns of photodetectors. For example, the two-dimensional array can include at least a 32 by 32 array of photodetectors. The two-dimensional array of photodetectors can include InGaAs. The InGaAs can be configured to receive wavelengths up to and including 1.7 microns. A filter assembly can be optically coupled to the two-dimensional array of photodetectors to improve signal to noise ratio.

The ROTC can have a frame-rate of at least 20,000 fps for reading frames from the two-dimensional array of photodetectors. It is contemplated that the ROTC can be operatively connected to the two-dimensional array of photodetectors to track and decode multiple laser spots at a time.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
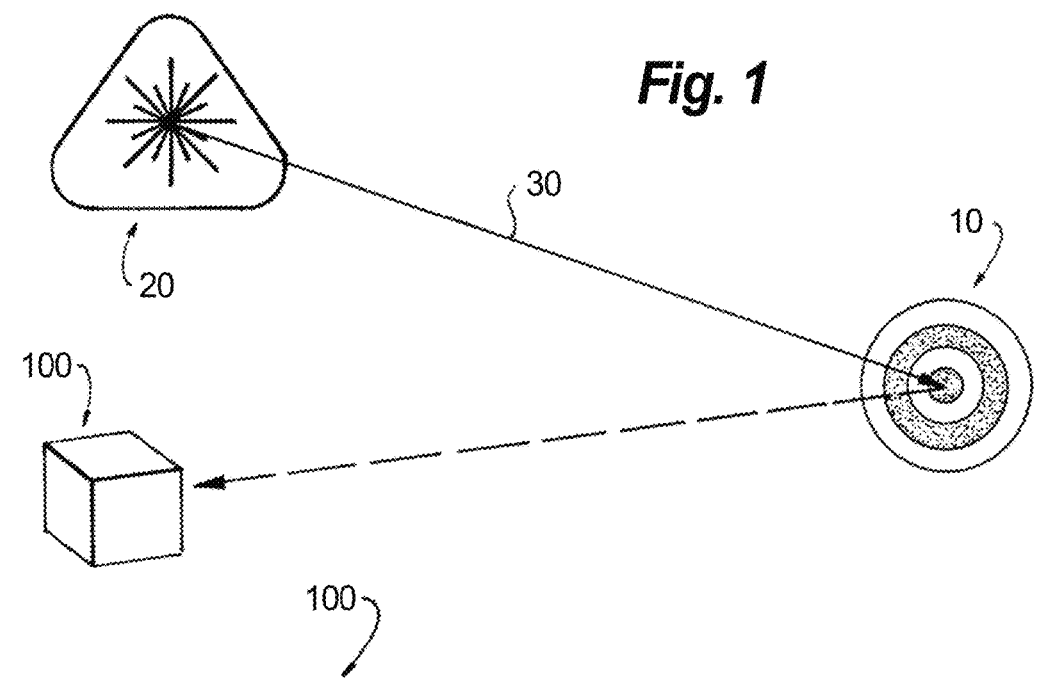
FIG. 1 is a schematic view of an exemplary embodiment of a laser designator pulse detector constructed in accordance with the present disclosure, showing a laser designator and target.

Reference will now be made to the drawings wherein like reference numerals identify similar structural features or aspects of the subject disclosure. For purposes of explanation and illustration, and not limitation, a partial view of an exemplary embodiment of laser designator pulse detector in accordance with the disclosure is shown in FIG. 1 and is designated generally by reference character 100. Other embodiments of pulse detectors in accordance with the disclosure, or aspects thereof, are provided in FIGS. 2-3, as will be described. The systems and methods described herein can be used to detect and decode pulsed laser signals.

Target 10 can be illuminated, or painted, by laser designator 20. In FIG. 1, the incident laser beam from laser designator 20 is identified with referenced character 30. A portion of beam 30 reflects from the target, as indicated by the dashed line in FIG. 1. Detector 100 receives a portion of the reflected laser from target 10. Laser designator 20 can pulse beam 30 with a predetermined code, and the pulses received by laser designator 100 can be decoded to provide target information to a person or system using detector 100.

Figure 2:
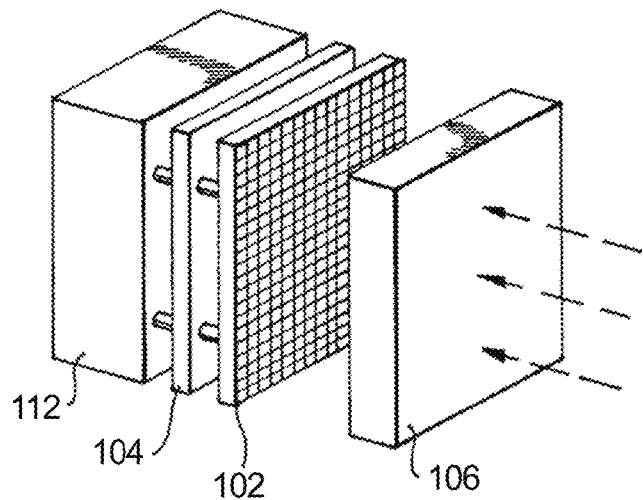
FIG. 2 is a schematic view of the pulse detector of FIG. 1, showing the focal plane array (FPA) with a two-dimensional array of pixels.

With reference now to FIG. 2, detector 100 includes a two-dimensional array 102 of photodetectors, i.e., pixels in a focal plane array (FPA), configured to convert laser signals into electrical signals. A read-out integrated circuit (ROIC 104) is operatively connected to the two-dimensional array 102 of photodetectors to condition voltages and electrical signals from the two-dimensional array 102 for detecting, tracking, and decoding pulsed codes in electrical signals from the two-dimensional array 102 in a separate module.

The two-dimensional array 102 of photodetectors includes a plurality of rows and a plurality of columns of photodetectors. Those skilled in the art will readily appreciate that any array geometry can be used, and that the rectangular array shown schematically in FIGS. 2 and 3 only one example. It is contemplated that a suitable two-dimensional array 102 can include at least a 32 by 32 array of photodetectors, for example. The two-dimensional array 102 is formed of InGaAs. The InGaAs can be configured, e.g., the relative amounts of indium arsenide and gallium arsenide can be adjusted, to receive wavelengths up to and including 1.7 microns, such as InGaAs optimized for receiving 1064 nm wavelength radiation, 1550 nm wavelength radiation, or any other suitable wavelength.

An optical assembly 106 is optically coupled to two-dimensional array 102, and can include one or more filter assemblies to improve signal to noise ratio and/or lens assemblies for forming an image of laser spots on two-dimensional array 102 from incident radiation, e.g., from one or more designators 20 reflecting off of one or more targets 10. For example, optical assembly 106 can include a single element lens or a lens array to optimize the collection of laser energy, and a narrowband filter in front of the two-dimensional array 102 to improve the signal to noise laser detection.

Figure 3:
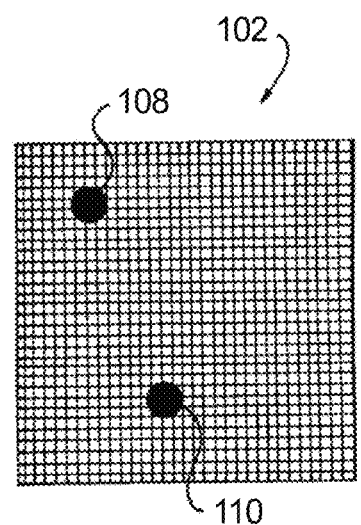
FIG. 3 is a schematic view of the focal plane array of FIG. 2, showing two laser spots on the two-dimensional array of pixels.

FIG. 3 schematically shows an image of two laser spots 108 and 110 received on two-dimensional array 102. Two-dimensional array 102 and ROIC 104 can be used for detecting, tracking, and decoding multiple laser spots at a time. This demonstrates a considerable advantage over traditional laser pulse decoders using a quadrant configuration, since the laser spots 108 and 110 can be tracked in two-dimensional space with significantly greater spatial resolution, allowing the user or system to identify the location of the pulse in two-dimensional space with greater accuracy.

Referring again to FIG. 2, the ROIC 104 can have a frame rate, e.g., at least 20,000 fps (20 kHz), for reading sequential image frames from the two-dimensional array 102. This rate allows ROIC 104 to detect pulse codes in the laser spots imaged on the two-dimensional array 102. When laser energy from a designator 20 is incident upon two-dimensional array 102, the signals are processed within an FPGA, or the like, to identify the location on the two-dimensional array 102 which detected the pulse. Supporting electronics 112, including the FPGA, are connected to receive data from ROTC 104, and can include additional data processing components and output connectors/interfaces, e.g., for controlling a guidance or tracking system, for overlying laser spot information on an image from a separate imaging device, or the like.

The methods and systems of the present disclosure, as described above and shown in the drawings, provide for laser pulse detectors with superior properties including tracking and decoding multiple laser spots with high spatial resolution. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A laser designator pulse detector comprising:
    an InGaAs photodetector configured to convert laser signals into electrical signals; and
    a ROIC operatively connected to the InGaAs photodetector to condition electrical signals from the InGaAs photodetector, wherein the ROIC is operatively connected to the InGaAs photodetector to condition signals for detecting, tracking, and decoding coded pulsed information in multiple laser spots at a time in a separate module.

2. A laser designator pulse detector as recited in claim 1, wherein the InGaAs photodetector is configured to receive wavelengths up to and including 1700 nm.

3. A laser designator pulse detector as recited in claim 1, wherein the InGaAs photodetector is configured to detect laser light of 1064 nm wavelength.

4. A laser designator pulse detector as recited in claim 1, wherein the InGaAs photodetector is configured to detect laser light of 1550 nm wavelength.

5. A laser designator pulse detector as recited in claim 1, wherein the ROIC is configured to read from the InGaAs photodetector at a frequency of 20 kHz.

6. A laser designator pulse detector as recited in claim 1, further comprising a filter assembly optically coupled to the InGaAs photodetector to improve signal to noise ratio.

7. A laser designator pulse detector comprising:
    a two-dimensional array of photodetectors configured to convert laser signals into electrical signals; and
    a ROIC operatively connected to the two-dimensional array of photodetectors to condition electrical signals from the two-dimensional array for detecting, tracking, and decoding pulsed codes in the electrical signals in a separate module, wherein the ROIC is operatively connected to the two-dimensional array to condition signals for detecting, tracking, and decoding coded pulsed information in multiple laser spots at a time in a separate module.

8. A laser designator pulse detector as recited in claim 7, wherein the two-dimensional array of photodetectors includes a plurality of rows and a plurality of columns of photodetectors.

9. A laser designator pulse detector as recited in claim 7, wherein the two-dimensional array includes at least a 32 by 32 array of photodetectors.

10. A laser designator pulse detector as recited in claim 7, wherein the ROIC has a frame-rate of at least 20,000 fps for reading frames from the two-dimensional array of photodetectors.

11. A laser designator pulse detector as recited in claim 7, wherein the two-dimensional array of photodetectors includes InGaAs.

12. A laser designator pulse detector as recited in claim 11, wherein the InGaAs is configured to receive wavelengths up to and including 1.7 microns.

13. A laser designator pulse detector as recited in claim 7, further comprising a filter assembly optically coupled to the two-dimensional array of photodetectors to improve signal to noise ratio.

* * * * *